Nov. 8, 1949  A. E. JENNINGS  2,487,711
FRICTION BRAKE
Filed July 8, 1947
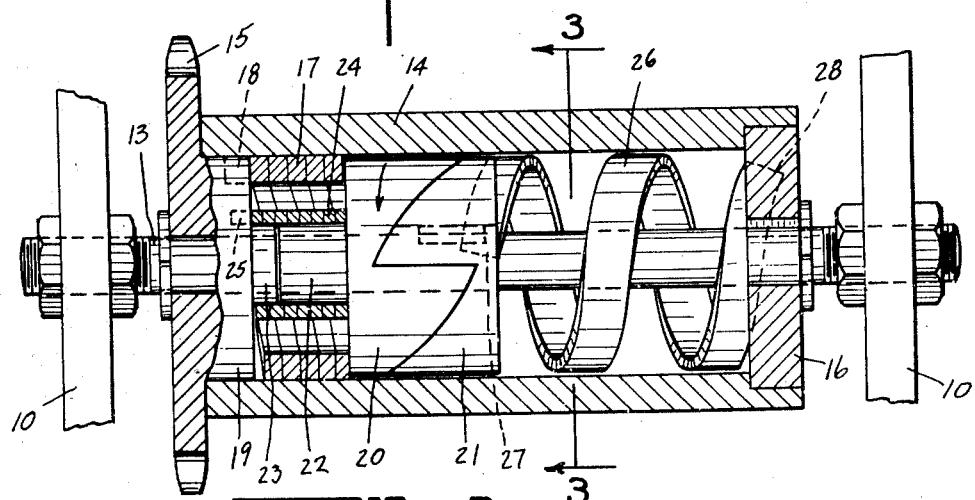
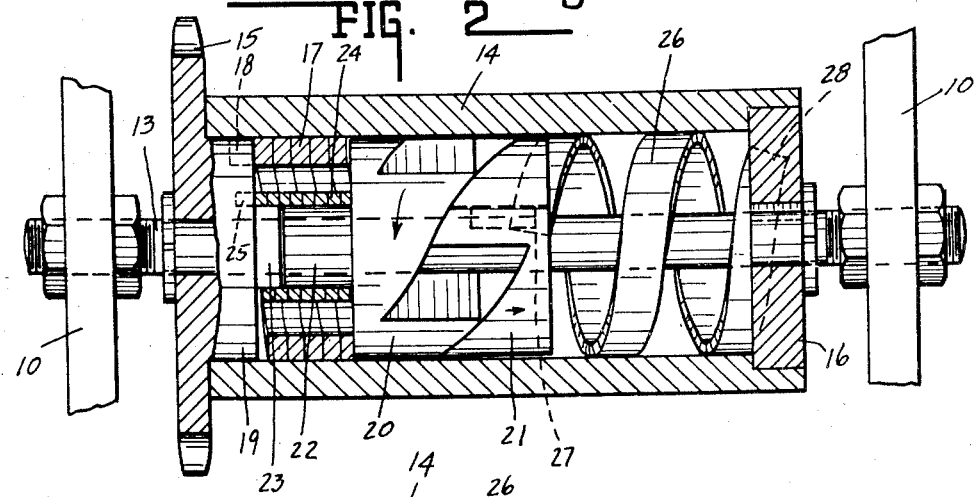
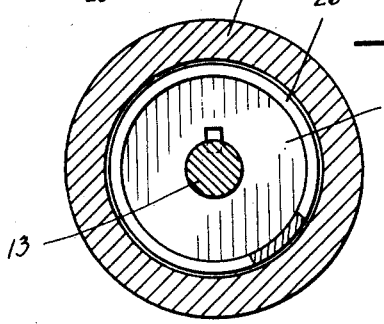
Inventor.
AUGUSTUS E. JENNINGS.
By Lockwood, Goldsmith & Galt.
Attorneys.

Patented Nov. 8, 1949

2,487,711

UNITED STATES PATENT OFFICE 2,487,711

FRICTION BRAKE

Augustus E. Jennings, Peoria, Ill., assignor to Edgar L. Jennings, Mooresville, Ind.

Application July 8, 1947, Serial No. 759,665

7 Claims. (Cl. 192—6)

This invention relates to a friction brake device for providing a braking action between two relatively movable parts such as in a bicycle coaster brake, or any vehicle or the like.

It is the purpose of this invention to provide a braking action of simple but efficient character such as may provide a maximum of braking surface applied by a minimum actuating force, and wherein the braking action will function smoothly without chatter or danger of locking.

This is accomplished through the medium of a spirally wound helical spring having an outer braking surface and adapted to be axially compressed for radial expansion into frictional and braking engagement with an inner friction surface of a cylindrical hub or brake drum, and wherein the ends of said spring are anchored against angular displacement while permitting of axial displacement.

It is recognized that brake devices have heretofore been proposed wherein the braking shoe is in the nature of a coil spring, but actuated through angular displacement of one end relative to the other for causing the spring to be energized in an expanding direction to thereby effect a clutching action such as will be built up progressively from one coil to the other. With such devices there results a chattering or locking up action which is dangerous for the usual braking action. As distinguished therefrom, applicant's spring has its ends so anchored as to prevent their angular displacement with the consequent self-energizing clutching action, so that no chattering or clutching and locking up action can result when the braking force is applied.

The full nature of the invention will be understood from the accompanying drawings and the following description and claims:

Fig. 1 is a central vertical section through a brake device showing the brake in inoperative position.

Fig. 2 is the same as Fig. 1 showing it in operative position.

Fig. 3 is a section taken on line 3—3 of Fig. 1.

In the drawings the friction brake is shown as applied to a bicycle coaster brake structure for illustrative purposes. However, it will be understood that it is similarly applicable to effect a braking action between any relatively rotatable parts such as an engine fly wheel, vehicle wheels, and similar structures of various types.

Herein shown there are provided bicycle or similar supporting frame members 10 between which the axle 13 is fixedly secured. Rotatably mounted upon the axle there is a driven member comprising an elongated cylindrical hub 14. At one end of said hub there is a driving member comprising a sprocket wheel 15 having its bearing upon the axle 13. At the other end of the hub there is provided a bearing plate 16 keyed upon the axle for rotatably supporting the other end of the hub thereon.

The cylindrical hub 14 is formed with an inner clutch surface with which the usual clutch spring is adapted to be expanded into clutching engagement. The clutch spring 17 is formed with an inturned toe 18 interlocked with the boss 19 of the driving sprocket 15, and is so wound that upon the driving sprocket being rotated in the driving direction it will expand the clutch spring 17 into engagement with the hub so as to rotate said hub in the driving direction, together with any wheel structure mounted thereon.

Journaled on the axle there are a pair of coacting cam members 20 and 21. The member 20 is formed with a stud 22 having an outer clutch surface which abuts the reduced stud 23 extending from the stud 19 on the driving sprocket, the latter stud having a cooperating outer clutch surface. Surrounding the studs 22 and 23 there is an inner clutch spring 24 having a toe 25 at one end thereof extending into the stud 19. Said spring is so wound that when the driving sprocket 15 is rotated in the driving direction the clutch spring 24 will be expanded to declutch and override the stud 22, whereby no rotary movement will be applied to the cam member 20. But when the driving sprocket is rotated in the reverse direction, the clutch spring 24 will be contracted into clutching engagement with the stud 22 thereby imparting rotation to the member 20 in the direction of the arrow.

The cam member 21 is slidably keyed upon the axle 13, whereby upon rotation of the cam member 20 it will be cammed axially thereof, but prevented from rotation. Mounted within the hub 14 there is a braking spring 26 of helically wound cylindrical structure and of an outer diameter only slightly less than the inner diameter of the hub 14. One end of said spring is provided with an anchoring toe 27 extending into anchored engagement with the slidable cam member 21. The other end of the spring is provided with an anchor toe 28 interlocked with the bearing plate 16 which in turn is secured to the axle 13 against rotation. Thus, the opposed ends of the braking spring 26 are anchored against angular displacement. The outer surface of the spring is formed for frictional contact with the inner surface of the hub and is, therefore, in the nature of a brake adapted to be moved into and out of hub braking engagement.

In operation, when the driving sprocket 15 is rotated in the driving direction the clutch spring 17 is expanded into clutching engagement with the hub 14 which is correspondingly rotated. The clutch spring 24, however, which rotates with the driving sprocket, is adapted to override the stud 22 on the cam member 20 so that the cam members will be held in their normal inoperative position as shown in Fig. 1 under the axial tension of the braking spring 26.

Upon the driving sprocket 15 being arrested for coasting or free wheeling, the driving clutch spring 17 will no longer be energized thereby and will permit the hub 14 to override it and freely rotate in the driving direction.

However, upon the driving sprocket being rotated in the reverse or braking direction, while the driving clutch spring 17 will be out of clutching engagement and ineffective, the clutch spring 24 will be wrapped down into clutching engagement with the stud 22 and thereby transmit rotary movement between the driving sprocket 15 and the cam member 20 in the direction of the arrow. The cam member 20 will thereby cam the member 21 axially upon the axle which action transmits axial compression between the ends of the braking spring 26. Such axial compression tends to expand the braking spring into frictional engagement with the inner surface of the hub 14 such as to resist its rotation and apply a braking action thereto commensurate with the compressive force applied by the braking movement of the driving sprocket 15.

Upon the brake spring being thus expanded, however, no positive or interlocking clutching action will occur due to its ends being held against angular displacement. Thus, there will be no self-energizing and build-up from one coil to another through angular displacement of one end of the spring relative to the other as in the case of the two clutch springs such as the clutch spring 17 and 24, respectively. This results in a smooth braking action entirely dependent upon the force exerted axially of the spring.

While the spring is herein shown as having only a few loose wound coils with a wide braking surface, a similar action is obtained through the use of a more closely wound coil spring having a greater number of coils and a relatively narrower braking surface for each coil.

I claim:

1. In a friction brake device, a driving member, a driven member having an annular friction surface, a supporting member for rotatably mounting said driving and driven members, spaced end elements non-rotatably fixed upon said supporting member, one of said elements being axially displaceable relative to the other, a helical braking spring having its ends secured to said end elements, respectively, against angular displacement, said spring being normally free of braking engagement with said friction surface and movable into braking engagement therewith upon axial displacement of its ends, and means operable by one of said members to cause said axially displaceable elements to force said spring into braking engagement with said surface.

2. In a friction brake device, a pair of coaxial members mounted for relative rotation, one of said members having an annular friction surface, a helical braking spring engageable with said surface normally free of braking engagement therewith, anchoring means secured to the other said member for anchoring one end of said spring thereto, and anchoring means interlocked with the other end of said spring non-rotatably and slidably mounted on said last mentioned member, and an actuating element manually movable in operative engagement with said last mentioned means for sliding it longitudinally of said last mentioned member in a direction to axially displace the ends of said spring while preventing angular displacement thereof to radially displace said spring into braking engagement with the friction surface of said first mentioned member.

3. In a friction brake device, a pair of coaxial members mounted for relative rotation, one of said members having an annular friction surface, a helical braking spring engageable with said surface normally free of braking engagement therewith, anchoring means secured to the other said member for anchoring one end of said spring thereto, an anchoring means interlocked with the other end of said spring non-rotatably and slidably mounted on said last mentioned member, and a manually rotatable cam operably associated with said last mentioned means to axially displace it and the ends of said spring relative to each other for effecting radial displacement of said spring into braking engagement with the friction surface of said first mentioned member.

4. In a friction brake device, a pair of coaxial members mounted for relative rotation one about the other, one of said members having an annular friction surface, a helical braking spring mounted between said members adapted to be radially expanded into braking engagement with said friction surface but normally free thereof, means for anchoring one end of said spring to the other said member, a cam element non-rotatably and slidably mounted on said last mentioned member anchored to the other end of said spring, and an associated cam actuated element rotatable relative thereto for effecting axial displacement thereof with the ends of said spring while preventing angular displacement of said ends for causing said spring to be radially displaced into braking engagement with the friction surface of said first mentioned member.

5. In a friction brake device, a driving member, a driven member having an annular friction surface, a supporting axle for rotatably mounting said members, a cam actuated element slidably keyed upon said axle against relative rotation, an actuating cam associated therewith for axially displacing said element upon relative rotation therebetween, a clutch connecting said actuating cam with said driving member for permitting relative rotation therebetween in one direction and a driving connection therebetween when said driving member is rotated in the opposite direction to effect said relative rotation, and a helical brake spring having a braking surface movable into and out of braking engagement with said friction surface and normally free of braking engagement therewith, one end of said spring being operably anchored to said axle and the other end of said spring to said element for preventing angular displacement therebetween, whereby upon axial displacement of said element by said actuating cam upon said relative rotation, said spring will be axially compressed to expand it into braking engagement with said friction surface.

6. In a friction brake device, a pair of coaxial members mounted for relative rotation, the outer of said members having an internal annular friction surface, a helical braking spring engageable with said friction surface normally free of braking engagement therewith, means for anchoring one end of said spring to the inner member, a cam actuated element slidably keyed against rotation on said inner member to which the opposite end of said spring is anchored to prevent angular displacement of the ends of said spring, an actuating cam adapted upon relative rotation in one direction to cam said actuated cam in a direction to axially compress said spring for expanding it into braking engagement with said friction surface.

7. In a friction brake device, a supporting axle, a hub rotatably mounted upon said axle having an inner annular friction surface, a driving member, an overrunning clutch between said driving member and hub adapted to effect a driving connection therebetween when said member is rotated in the driving direction, a camming element journaled on said axle, an overrunning clutch adapted to effect driving connection between said camming element and driving member when said member is rotated in the non-driving direction, a mating cam slidably keyed on said axial for axial displacement relative thereto by said camming element upon rotation thereof by said driving member, and a helically wound braking spring having one end operably connected with said axle and the other end with said cam against angular displacement therebetween, the outer surface of said spring forming a braking surface expansible into braking engagement with said drum upon said cam being displaced axially to axially compress said spring.

AUGUSTUS E. JENNINGS.

REFERENCES CITED

The following references are of record in the file of this patent:

UNITED STATES PATENTS

| Number | Name | Date |
|---|---|---|
| 1,574,173 | Schall | Feb. 23, 1926 |
| 2,278,270 | Kurzina | Mar. 31, 1942 |

FOREIGN PATENTS

| Number | Country | Date |
|---|---|---|
| 8,489 | Great Britain | Apr. 13, 1904 |
| 377,262 | Germany | June 13, 1923 |